UNITED STATES PATENT OFFICE.

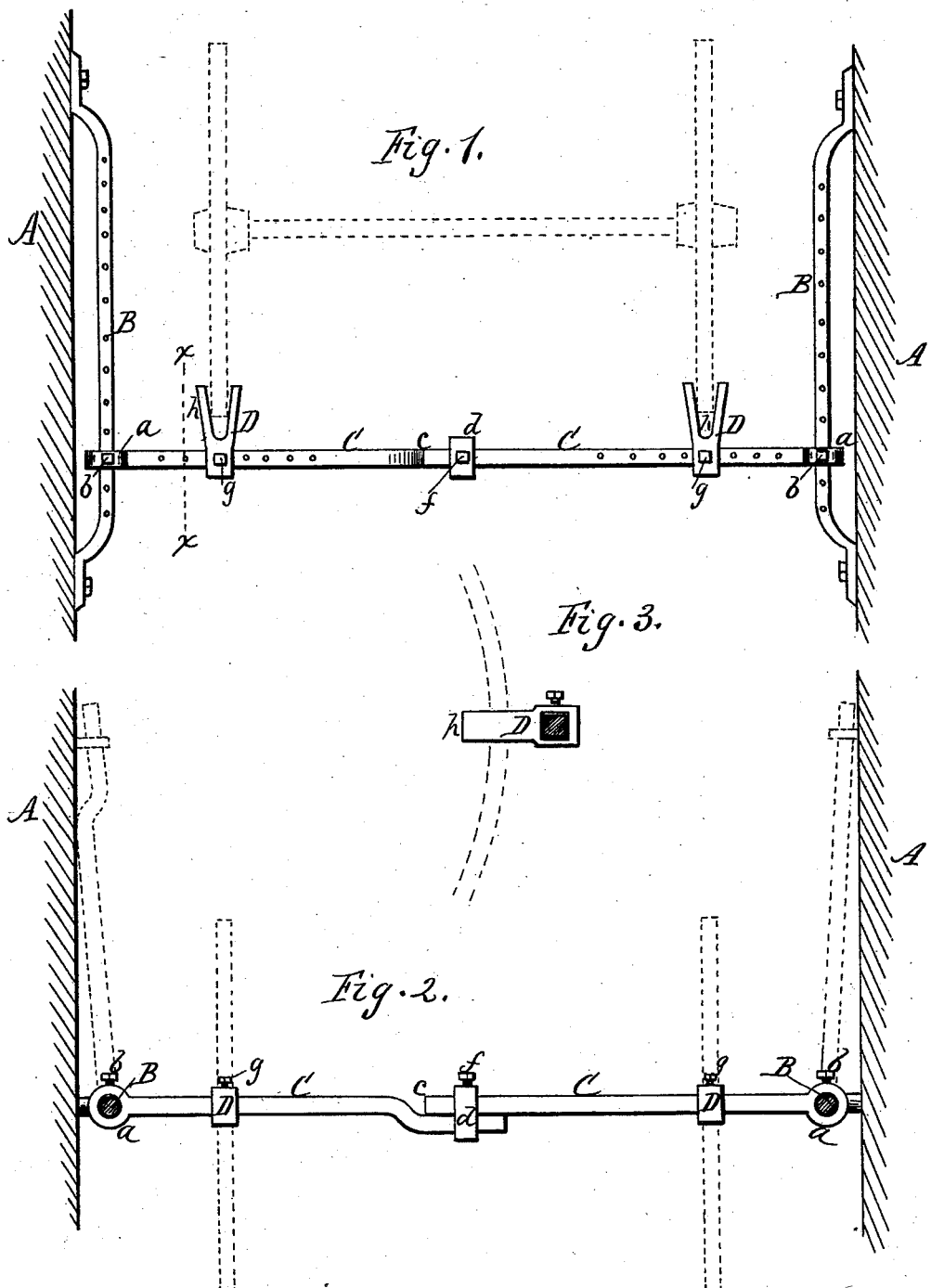

E. MURRAY LOZIER, OF ROCHESTER, NEW YORK, ASSIGNOR TO THE JAMES CUNNINGHAM SON & COMPANY, OF SAME PLACE.

ATTACHMENT FOR HOLDING VEHICLES IN CARS.

SPECIFICATION forming part of Letters Patent No. 362,453, dated May 3, 1887.

Application filed February 17, 1887. Serial No. 228,003. (No model.)

*To all whom it may concern:*

Be it known that I, E. MURRAY LOZIER, of Rochester, in the county of Monroe and State of New York, have invented a certain new and useful Improvement in Attachments for Holding Vehicles in Cars During Transportation; and I do hereby declare that the following is a full, clear, and exact description of the same, reference being had to the drawings accompanying this application.

My improvement relates to means for securing heavy vehicles—such as coaches, &c.—in cars during transportation, so that they will not "shuck" or get out of place, and therefore will not be marred or injured under ordinary circumstances. It has been the practice heretofore to secure them by "chocks" or blocks placed in front and rear of the wheels and secured to the floor of the car; but they are insecure, and require much labor in attaching them. The great difficulty to overcome has been to provide devices that can remain a fixture to the car and not be in the way in loading the car with other freight.

My invention relates to fixtures attached permanently to the car, and arranged so as to be turned up out of the way against the sides of the car when not in use, as will be more fully described.

In the drawings, Figure 1 is a plan view of the attachment located in a car and in position for holding the vehicle. Fig. 2 is a front elevation of the same. Fig. 3 is an enlarged cross-section in line *x x* of Fig. 1.

A A indicate the two opposite sides of a freight-car adapted to receive and carry vehicles mounted on the wheels.

My improvement is as follows:

B B are two horizontal rods attached firmly to the sides of the car opposite each other, and standing a little distance away from the sides, as shown.

C C are two arms, having knuckles *a a*, that slide and turn freely on the rods, and are secured at any position by set-screws *b b*. When turned down, these arms meet in the center of the car and overlap each other, as shown at *c*, and are secured by a sliding coupling, *d*, through which passes a set-screw, *f*, clamping the parts together, and making them stiff, like one arm. The rods B B and arms C C may have nicks or indentations on their upper surfaces, as shown, into which the set screws may strike to prevent slipping.

D D are clevises sliding freely on the square arms C C, and secured at any position by set-screws *g g*. These clevises are forked, as shown at *h h*, the forks being angular, standing outward, and serving to receive the rims of the wheels, which are shown in dotted lines in the drawings. The forks by being angular bear only against the edges of the metallic tires, and not against the wood of the wheel, and therefore the rims of the wheels will not be marred.

The operation is as follows: Two of these sets of fixtures are used with each carriage—one located in front and the other behind. The carriage is located in place, and the arms C C are then turned down and locked together, and the clevises D D are adjusted on the arms so as to coincide with the rims of the wheels. The arms C C are then slid forward on the rods B B till the clevises fit closely to the rims of the wheels. The set-screws *b b* are then turned down tightly in place. By this means the carriage is secured against any forward-and-back movement, and also against any lateral or side movement, and requires no other fastenings. It cannot get out of place or get injured under ordinary shocks and concussions of transportation.

This invention can be used for holding all sorts of vehicles during transportation; but it is specially of use in holding heavy carriages, such as coaches, &c.

When the fixtures are not in use, the arms C C are disengaged at the center and turned up vertically against the sides of the car, and are secured by straps or other attachments, as indicated by the dotted lines in Fig. 2. In this condition they are out of the way, and the car can be loaded with other freight.

Having described my invention, what I claim as new, and desire to secure by Letters Patent, is—

1. The combination of the horizontal rods forming bearings attached to the sides of the car and the arms sliding on said rods, the arms provided with attachments that hold the wheels of the carriage, as specified.

2. The combination of the horizontal rods attached to the sides of the car and the arms sliding on said rods, said arms lapping at the center and secured by a coupling, as specified, and provided with attachments to hold the wheels of the carriage, as set forth.

3. The combination of the rods attached to the sides of the car, the arms sliding on the rods, and the clevises sliding on the arms, said clevises made with forked ends that receive the rims of the wheels, as set forth.

4. The combination, with the arms held in front or rear of the carriage, of clevises sliding on the arms and secured in position by set-screws, said clevises being provided with forked ends to receive the rims of the wheels, as set forth.

In witness whereof I have hereunto signed my name in the presence of two subscribing witnesses.

E. MURRAY LOZIER.

Witnesses:
R. F. OSGOOD,
P. A. COSTICH.